United States Patent [19]

Yamada

[11] Patent Number: 5,801,890
[45] Date of Patent: Sep. 1, 1998

[54] TAKING LENS SYSTEM

[75] Inventor: Hiroshi Yamada, Saitama-ken, Japan

[73] Assignee: Fuji Photo Optical Co., Ltd., Saitama-Ken, Japan

[21] Appl. No.: 863,602

[22] Filed: May 27, 1997

Related U.S. Application Data

[63] Continuation of Ser. No. 356,585, Dec. 15, 1994, abandoned.

[30] Foreign Application Priority Data

Dec. 15, 1993 [JP] Japan ................................ 5-314649

[51] Int. Cl.$^6$ ........................................... G02B 9/04
[52] U.S. Cl. ........................................... 359/793; 359/794
[58] Field of Search ........................ 359/661, 663, 359/784, 791, 793, 794, 691, 692, 717, 719

[56] References Cited

U.S. PATENT DOCUMENTS

| | | |
|---|---|---|
| 3,476,462 | 11/1969 | Benford ................................ 359/661 |
| 4,614,409 | 9/1986 | Sakai ................................... 350/410 |
| 4,742,369 | 5/1988 | Ishii et al. .......................... 354/441 |
| 5,475,537 | 12/1995 | Kobayashi et al. ................. 359/794 |

FOREIGN PATENT DOCUMENTS 420825  8/1934  United Kingdom .

*Primary Examiner*—Georgia Y. Epps
*Assistant Examiner*—Dawn-Marie Bey
*Attorney, Agent, or Firm*—Sixbey, Friedman, Leedom & Ferguson; Gerald J. Ferguson, Jr.; Evan R. Smith

[57] ABSTRACT

An image pickup lens system consists of first and second lens elements arranged in this order from the object side. The first lens element is a meniscus lens having a weak refractive power and concave toward the object side, and the second lens element has a positive refractive power. The following formula is satisfied.

$$0.19 \leq d_1/f \leq 1.7$$

wherein $d_1$ represents the central thickness of the first lens element and f represents the focal length of the overall lens system.

19 Claims, 5 Drawing Sheets

SPHERICAL ABERRATION
FNo = 2.800

ASTIGMATISM
ω = 28.0°

DISTORTION
ω = 28.0°

COMA
ON AXIS 0.05mm

ω = 13.7°

0.05mm

ω = 19.3°

0.05mm

ω = 28.0°

0.05mm

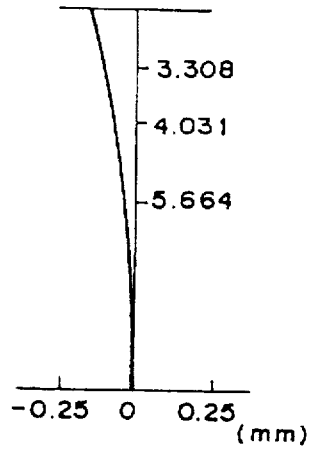
FIG.3A
SPHERICAL ABERRATION
FNo = 2.800
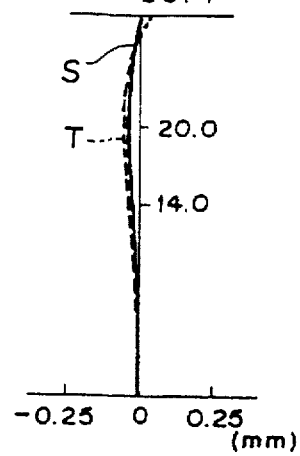
FIG.3B
ASTIGMATISM
ω = 30.4°
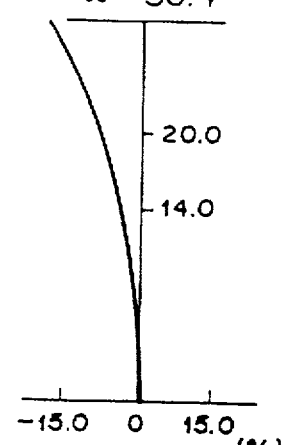
FIG.3C
DISTORTION
ω = 30.4°
COMA
FIG.3D
ON AXIS
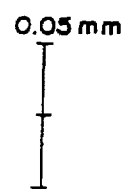
0.05 mm
FIG.3E
ω = 14.0°
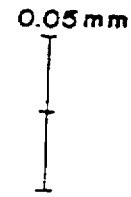
0.05 mm
FIG.3F
ω = 20.0°
0.05 mm
FIG.3G
ω = 30.4°
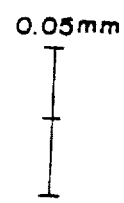
0.05 mm SPHERICAL ABERRATION
FNo=2.800

ASTIGMATISM
ω=29.4°

DISTORTION
ω=29.4°

COMA
ON AXIS
0.05mm

ω=13.9°
0.05mm

ω=19.8°
0.05mm

ω=29.4°
0.05mm

TAKING LENS SYSTEM

This application is a Continuation of Ser. No. 08/356,585, filed Dec. 15, 1994, now abandoned.

BACKGROUND OF THE INVENTION

1. Field of the Invention

This invention relates to an image pickup lens system consisting of two lens elements, and more particularly to an image pickup lens system which consists of two lens elements and is suitable for use as an image pickup lens system for a video camera or a still-video camera for a visual phone, a door phone, monitoring or the like.

2. Description of the Prior Art

Recently a solid state image pickup device has been in wide use in various video cameras or still-video cameras. The solid state image pickup device has been made smaller year by year and accordingly there has been a demand for miniaturization of an image pickup lens system and for reduction in cost of an image pickup lens system. Especially a two-lens image pickup lens system in which the lens grinding cost can be reduced is required.

In video cameras and still-video cameras, a low-pass filter for avoiding moire patterns, an infrared cut filter for correcting the spectral sensitivity of the solid state image pickup device and/or a cover glass for protecting the image surface of the image pickup device are generally disposed between image pickup lens system and the solid state image pickup device. In such a case, an image pickup lens system should have a long back focal length in order to accommodate such optical elements.

Further, there has been known a two-lens taking lens system comprising a first lens element which is a plastic meniscus lens having a negative refracting power and convex toward the object and a second lens element having a positive refracting power, the first and second lens elements being arranged in this order from the object side. However this lens system is disadvantageous in that the image forming performance is apt to deteriorate due to change in the temperature and the humidity since the lens system comprises a plastic lens. Further the mold for molding the lens is expensive, which adds to the manufacturing cost of the lens system.

SUMMARY OF THE INVENTION

In view of the foregoing observations and description, the primary object of the present invention is to provide a two-lens image pickup lens system which has a long back focal length, can be relatively large in angle of view, is clear, is small in size and can be manufactured at low cost.

Another object of the present invention is to provide a two-lens image pickup lens system which can be manufactured at a lower cost and whose image forming performance is less apt to deteriorate due to change in the temperature and the humidity.

An image pickup lens system in accordance with the present invention comprises first and second lens elements arranged in this order from the object side. The first lens element is a meniscus lens having a weak refractive power and concave toward the object side, and the second lens element has a positive refractive power. The following formula is satisfied.

$$0.19 \leq d_1/f \leq 1.7$$

wherein $d_1$ represents the central thickness of the first lens element and f represents the focal length of the overall lens system.

Preferably the first and second lens elements are of glass.

In an image pickup lens system of the present invention, since the first lens is a meniscus lens having a weak refractive power and concave toward the object side, the principal point on the image plane side is kept far from the object and accordingly the back focal length of an image pickup lens system can be long. The concave face of the first lens facing toward the object erects the image plane which is inclined under by the second lens element which is a convex lens. Though the distortion of the lens system becomes under due to the concave face of the first lens element, practically it gives rise to no problem when the half angle of view is about 29°.

The above formula limits the value of the ratio of the central thickness $d_1$ of the first lens element to the synthetic focal length f of the overall lens system and when the formula is satisfied, the first lens can be easily ground and the manufacturing cost can be reduced. Further the overall lens system can be smaller in size. That is, when the value of $d_1/f$ exceeds the upper limit, the central thickness $d_1$ of the first lens element becomes too large as compared with the diameter of the first lens element and the first lens element becomes difficult to grind, which adds to the manufacturing cost of the lens system. Though the first lens element becomes easy to grind when the diameter of the first lens element is enlarged, this results in a larger size of the first lens element. When the first lens element becomes larger, the size of the overall lens system becomes larger and the manufacturing cost of the lens system increases due to increase in the cost of glass material. When the value of $d_1/f$ becomes smaller than the lower limit, the radius of curvature of the concave face of the first lens element must be smaller in order to elongate the back focal length and the first lens element becomes difficult to grind, which adds to the manufacturing cost of the lens system.

When the first and second lens elements are made of glass, the image forming performance is less apt to deteriorate due to change in the temperature and the humidity as compared with when they are made of plastic material. Further since the mold for molding the lens is not necessary, the manufacturing cost of the lens system can be reduced.

DESCRIPTION OF THE PREFERRED EMBODIMENTS

Figure 1A:
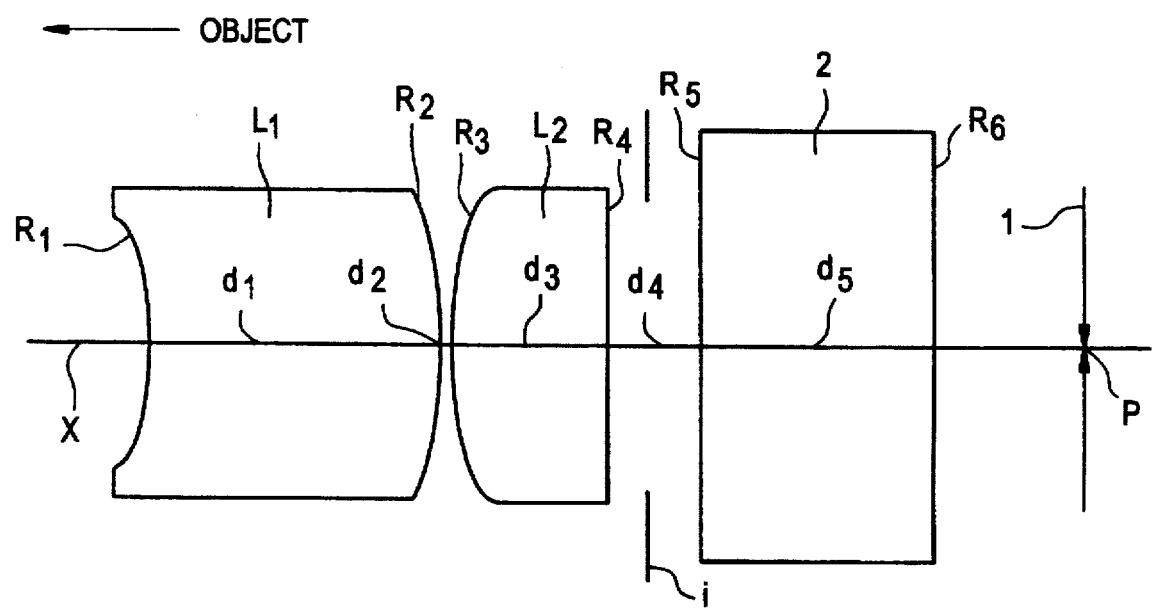
FIG. 1A is a schematic cross-sectional view showing the arrangement of the lens elements in an image pickup lens systems in accordance with first and second embodiments of the present invention.
Figure 1B:
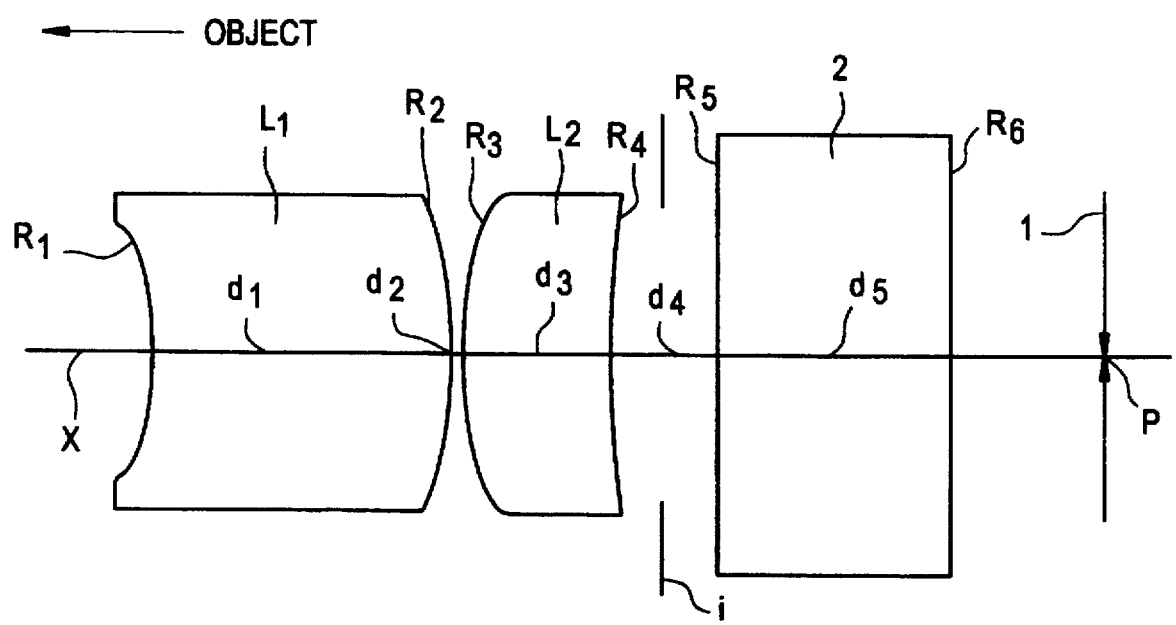
FIG. 1B is a schematic cross-sectional view showing the arrangement of the lens elements in taking lens systems in accordance with a third embodiment of the present invention.
Figure 2A:
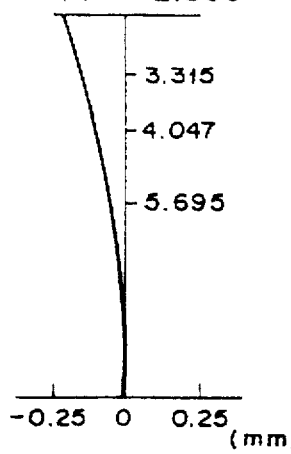
FIGS. 2A to 2G respectively show spherical aberration, astigmatism, distortion and comas for "on axis", "ω=13.7°", "ω=19.3°", and "ω=28.0°" of an image pickup lens system in accordance with the first embodiment of the present invention, FIGS. 3A to 3G respectively show spherical aberration, astigmatism, distortion and comas for "on axis", "ω=14.0°", "ω=20.0°", and "ω=30.4°" of the taking lens system in accordance with the second embodiment of the present invention, and FIGS. 4A to 4G respectively show spherical aberration, astigmatism, distortion and comas for "on axis", "ω=13.9°", "ω=19.8°", and "ω=29.4°" of an image pickup lens system in accordance with the third embodiment of the present invention.
Figure 2B:
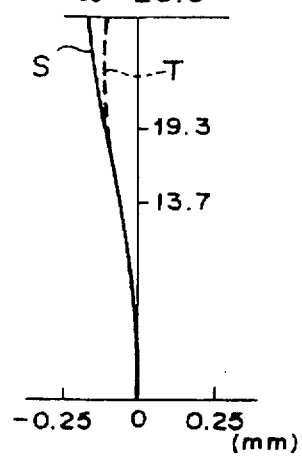
Figure 2C:
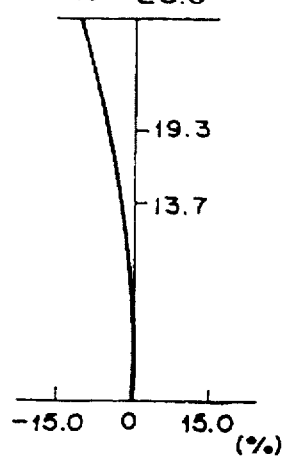
Figure 2D:
Figure 2E:
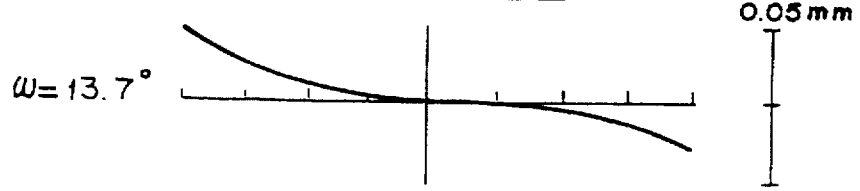
Figure 2F:
Figure 2G:
Figure 4A:
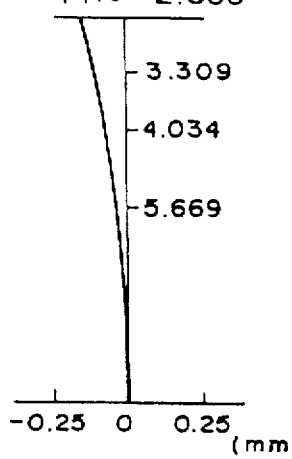
Figure 4B:
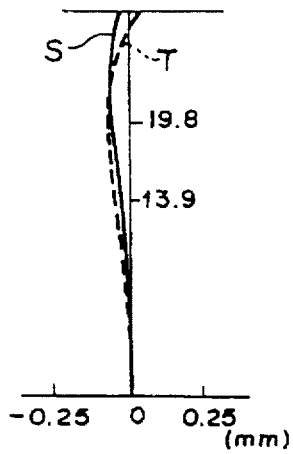
Figure 4C:
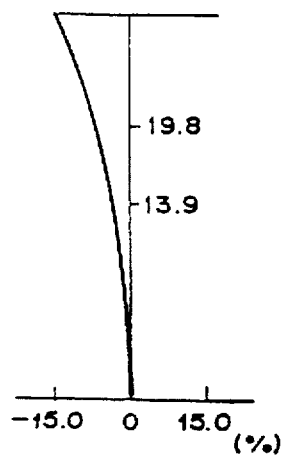
Figure 4D:
Figure 4E:
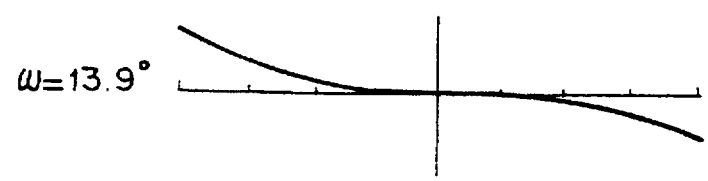
Figure 4F:
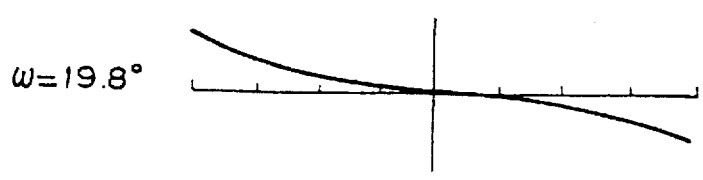
Figure 4G:
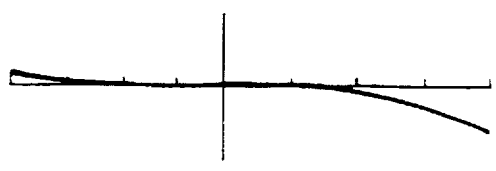

As shown in FIG. 1, each of an image pickup lens systems in accordance with the first to third embodiments of the present invention comprises first and second lens elements $L_1$ and $L_2$ arranged in this order from the object side. A low-pass filter 2 is disposed between the second lens element $L_2$ and a solid state image pickup device 1. In the second and third embodiments, a stop i is disposed between the second lens element $L_2$ and the low-pass filter 2, and in the first embodiment, an assumed stop is disposed in the middle of the second lens element $L_2$. Light entering an image pickup lens system along the optical axis X is focused on an imaging position P of the solid state image pickup device 1.

In the first embodiment, the first lens element $L_1$ is a meniscus lens having a weak negative refractive power and concave toward the object side, and in the second and third embodiments, the first lens element $L_1$ is a meniscus lens having a weak positive refractive power and concave toward the object side. In the first and second embodiments, the second lens element $L_2$ is a double-convex lens having a positive refractive power and in the third embodiment (shown in FIG. 1B), the second lens element $L_2$ is a meniscus lens having a positive refractive power. In each taking lens system, both the first and second lens elements $L_1$ and $L_2$ are made of glass.

Each of an image pickup lens systems satisfies the formula $$0.19 \leq d_1/f \leq 1.7$$

wherein $d_1$ represents the thickness of the first lens element $L_1$ as measured along the optical axis and f represents the focal length of the overall lens system.

The radii of curvature R(mm) of the refracting surfaces, the axial surface separations d (mm) (the central thicknesses of the lenses or the air separations), the refractive indexes n for the e-line of the lenses and the Abbe's numbers ν of the lenses of an image pickup lens systems in accordance with the first to third embodiments are as shown in tables 1 to 3, respectively. In the tables, the radii of curvature of the refracting surfaces, the axial surface separations, the refractive indexes for the e-line and the Abbe's numbers of the lenses are designated in order from the object side at $R_1$ to $R_6$, $d_1$ to $d_5$, $n_1$ to $n_3$ and $v_1$ to $v_3$.

TABLE 1

| radius of curvature R | axial surface separation d | refracting index n | Abbe's number ν |
|---|---|---|---|
| $R_1 = -3.017$ | $d_1 = 1.2$ | $n_1 = 1.77621$ | $v_1 = 49.6$ |
| $R_2 = -3.676$ | $d_2 = 0.1$ | | |
| $R_3 = 12.235$ | $d_3 = 0.3$ | $n_2 = 1.83962$ | $v_2 = 43.0$ |
| $R_4 = -10.120$ | $d_4 = 2.3$ | | |
| $R_5 = \infty$ | $d_5 = 4.3$ | $n_3 = 1.51824$ | $v_3 = 64.0$ |
| $R_6 = \infty$ | | | |

In the first embodiment, the focal length f of the overall lens system is 6.25 mm, the back focal length is 6.66 mm and $d_1/f$ is 0.19. Further the F number and the half angle of view ω are 2.8 and 28.50, respectively.

TABLE 2

| radius of curvature R | axial surface separation d | refracting index n | Abbe's number ν |
|---|---|---|---|
| $R_1 = -4.785$ | $d_1 = 5.0$ | $n_1 = 1.77621$ | $v_1 = 49.6$ |
| $R_2 = -6.965$ | $d_2 = 0.1$ | | |
| $R_3 = 8.142$ | $d_3 = 3.0$ | $n_2 = 1.83962$ | $v_2 = 43.0$ |
| $R_4 = -105.550$ | $d_4 = 3.2$ | | |
| $R_5 = \infty$ | $d_5 = 4.3$ | $n_3 = 1.51824$ | $v_3 = 64.0$ |
| $R_6 = \infty$ | | | |

In the second embodiment, the focal length f of the overall lens system is 6.25 mm, the back focal length is 7.57 mm and $d_1/f$ is 0.8. Further the F number and the half angle of view ω are 2.8 and 29.8°, respectively.

TABLE 3

| radius of curvature R | axial surface separation d | refracting index n | Abbe's number ν |
|---|---|---|---|
| $R_1 = -6.37$ | $d_1 = 9.75$ | $n_1 = 1.77621$ | $v_1 = 49.6$ |
| $R_2 = -10.373$ | $d_2 = 0.1$ | | |
| $R_3 = 8.521$ | $d_3 = 3.0$ | $n_2 = 1.83962$ | $v_2 = 43.0$ |
| $R_4 = 144.520$ | $d_4 = 4.4$ | | |
| $R_5 = \infty$ | $d_5 = 4.3$ | $n_3 = 1.51824$ | $v_3 = 64.0$ |
| $R_6 = \infty$ | | | |

In the third embodiment (shown in FIG. 1B), the focal length f of the overall lens system is 6.28 mm, the back focal length is 8.76 mm and $d_1/f$ is 1.55. Further the F number and the half angle of view ω are 2.8 and 30.7°, respectively.

FIGS. 2A to 2G, FIGS. 3A to 3G and FIGS. 4A to 4G respectively show various aberrations of an image pickup lens systems of the first to third embodiments.

As can be understood from FIGS. 2A to 2G, FIGS. 3A to 3G and FIGS. 4A to 4G, an image pickup lens system of each embodiment is excellent in aberrations.

In an image pickup lens system of each embodiment, the Abbe's number of the first lens element $L_1$ is not smaller than 40, whereby the axial aberration can be made small. Further, an image pickup lens system of each embodiment has a long back focal length and a wide half angle of view ω (as wide as about 29°) and is clear (F number is 2.8). At the same time, an image pickup lens system of each embodiment is small in size and can be manufactured at low cost.

The arrangement of an image pickup lens system in accordance with the present invention need not be limited to those described above in conjunction with the first to third embodiments, but the radius of curvature of each lens element, the axial surface separations (including the thickness of the lens elements) and the like may be variously modified without departing from the spirit and scope of the invention.

Instead of the low-pass filter employed in the embodiments described above or in addition to the low-pass filter, an infrared cut filter and/or a cover glass may be inserted between an image pickup lens system and the solid state image pickup device.

As can be understood from the description above, an image pickup lens system of the present invention is long in the back focal length, relatively wide in the half angle of view, clear and small in size and can be manufactured at low cost. Accordingly, an image pickup lens system of the present invention is suitable as an image pickup lens for various video cameras and still-video camera.

What is claimed is:

1. An image pickup lens system for a solid state video frame pickup device, consisting of first and second lens elements arranged in this order from the object side to an image plane containing the solid state video frame pickup device, the first lens element being a meniscus lens having a refractive power and concave toward the object side and the second lens element having a positive refractive power wherein the formula $$0.19 \leq d_1/f \leq 1.7$$

is satisfied wherein $d_1$ represents the central thickness of the first lens element and f represents the focal length of the overall lens system.

2. An image pickup lens system as defined in claim 1 in which the first and second lens elements are of glass.

3. The image pickup lens system of claim 1 wherein the second lens element is a meniscus lens.

4. The image pickup lens system of claim 1 wherein the second lens element is a double convex lens.

5. The image pickup lens system of claim 1 wherein an Abbe's number of the first lens element is not smaller than 40.

6. The image pickup lens system of claim 1 wherein a half angle of view of the lens system is about 29°.

7. The image pickup lens system of claim 1 wherein a focal length of the second lens element is greater than f.

8. The image pickup lens system of claim 1 further comprising one of an infrared cut filter, a cover glass, and a low pass filter, located between the second lens element and the image plane.

9. An image pickup lens system for a solid state video frame pickup device, consisting of first and second lens elements and a low pass filter arranged in this order from an object side to an image plane containing the solid state video frame pickup device, the first lens element being a meniscus lens having a refractive power and concave toward the object side and the second lens element having a positive refractive power wherein the formula $$0.19 \leq d_1/f \leq 1.7$$

is satisfied wherein $d_1$ represents the central thickness of the first lens element and f represents the focal length of the overall lens system.

10. The image pickup lens system of claim 9 further comprising a stop located between said second lens element and said low pass filter.

11. The image pickup lens system of claim 9 in which the first and second lens elements are of glass.

12. The image pickup lens system of claim 9 wherein the second lens element is a meniscus lens.

13. The image pickup lens system of claim 9 wherein the second lens element is a double convex lens.

14. The image pickup lens system of claim 9 wherein an Abbe's number of the first lens element is not smaller than 40.

15. The image pickup lens system of claim 9 wherein a half angle of view of the lens system is about 29°.

16. The image pickup lens system of claim 9 wherein a focal length of the second lens element is greater than f.

17. The image pickup lens system of claim 9 further comprising one of an infrared cut filter and a cover glass located between the second lens element and the image plane.

18. The image pickup lens system of claim 9 wherein the second lens element is a spherical lens.

19. An image pickup lens system for a solid state video frame pickup device, consisting of first and second lens elements arranged in this order from the object side to an image plane containing the video frame pickup device, the first lens element being a meniscus lens having a refractive power and concave toward the object side and the second lens element having a positive refractive power wherein the formula $$0.19 \leq d_1/f \leq 1.7$$

is satisfied wherein $d_1$ represents the central thickness of the first lens element and f represents the focal length of the overall lens system, and wherein the second lens element is a spherical lens.

* * * * *